(12) United States Patent
Jiang et al.

(10) Patent No.: US 12,106,020 B2
(45) Date of Patent: Oct. 1, 2024

(54) DYNAMIC PREDICTION METHOD AND SYSTEM FOR INITIATION VOLUME OF DEBRIS FLOW SLOPE SOURCE

(71) Applicant: Institute of Mountain Hazards and Environment, Chinese Academy of Sciences, Chengdu (CN)

(72) Inventors: Yuanjun Jiang, Chengdu (CN); Xiaobo Hu, Chengdu (CN); Lijun Su, Chengdu (CN); Xin Xia, Chengdu (CN)

(73) Assignee: INSTITUTE OF MOUNTAIN HAZARDS AND ENVIRONMENT, CHINESE ACADEMY OF SCIENCES, Chengdu (CN)

( * ) Notice: Subject to any disclaimer, the term of this patent is extended or adjusted under 35 U.S.C. 154(b) by 712 days.

(21) Appl. No.: 17/341,275

(22) Filed: Jun. 7, 2021

(65) Prior Publication Data
US 2022/0222393 A1    Jul. 14, 2022

(30) Foreign Application Priority Data

Jan. 11, 2021 (CN) .......................... 202110030645.X (51) Int. Cl.
*G06F 30/20* (2020.01)
*G06F 17/18* (2006.01)
(Continued)

(52) U.S. Cl.
CPC .............. *G06F 30/20* (2020.01); *G06F 17/18* (2013.01); *G06F 2111/08* (2020.01); *G06F 2111/10* (2020.01)

(58) Field of Classification Search
CPC ...... G06F 30/20; G06F 17/18; G06F 2111/08; G06F 2111/10; G06F 30/28;
(Continued)

(56) References Cited

PUBLICATIONS

Dias et al. "Castanea sativa Mill. plantations as a low-carbon landslide hazard mitigation measure" E3S Web of Conferences 205, 12003 (2020) ICEGT 2020; https://doi.org/10.1051/e3sconf/202020512003 [retrieved on Mar. 17, 2024] (Year: 2020).*

(Continued)

*Primary Examiner* — Kamini S Shah
*Assistant Examiner* — Alfred H B Wechselberger
(74) *Attorney, Agent, or Firm* — Bayramoglu Law Offices LLC (57) ABSTRACT

The present disclosure relates to a prediction method and system for an initiation volume of a debris flow slope source. The prediction method includes: dividing a debris flow source slope to be predicted into soil columns; determining a positional relationship between a selected central soil column and six adjacent soil columns around; calculating a most unfavorable sliding surface of the soil column and an unbalanced force on the sliding surface according to an upper bound theorem of a limit analysis; determining whether the most unfavorable sliding surface is unstable; determining a mode and a size of a force exerted by an unstable soil column on a surrounding soil column according to a break status of a connection bond of a lateral tensile stress of the central soil column; and finally determining whether the soil column is fluidized, and predicting an initiation volume of the debris flow source slope.

8 Claims, 3 Drawing Sheets

(51) Int. Cl.
*G06F 111/10* (2020.01)
*G06F 111/08* (2020.01)

(58) Field of Classification Search
CPC ............ G06F 2113/08; G06F 2119/14; G06F 30/25; G06F 30/27; G06F 2111/00–2119/22
See application file for complete search history.

(56) References Cited

PUBLICATIONS

Wu et al. "Effect of Vegetation on Stability of Soil Slopes: Numerical Aspect" Chapter in Springer Series in Geomechanics and Geoengineering; DOI: 10.1007/978-3-319-11053-0_15 [retrieved on Mar. 17, 2024] (Year: 2015).*

Lehman et al. "Hydromechanical triggering of landslides: From progressive local failures to mass release" Water Resources Research, vol. 48, W03535, doi: 10.1029/2011WR010947, 2012 [retrieved on Mar. 17, 2024] (Year: 2012).*

Fan, L. "Catchment Scale Prediction of Rainfall-Induced Landslides and Subsequent Debris Flows on Heterogeneous Hillslopes" [Thesis] Diss. No. ETH 23713, ETH Zurich [retrieved on Mar. 17, 2024] (Year: 2016).*

Lehmann et al. "Deforestation Effects on Rainfall-Induced Shallow Landslides: Remote Sensing and Physically-Based Modelling" Water Resources Research, vol. 55, https://doi.org/10.1029/2019WR025233 [retrieved on Mar. 17, 2024] (Year: 2019).*

* cited by examiner

DYNAMIC PREDICTION METHOD AND SYSTEM FOR INITIATION VOLUME OF DEBRIS FLOW SLOPE SOURCE

TECHNICAL FIELD

The present disclosure relates to the technical field of prevention and control of debris flow disasters, in particular to a dynamic prediction method and system for an initiation volume of a debris flow slope source.

BACKGROUND

In recent years, debris flows occurred frequently due to extreme weather (such as heavy rainfall and storms) and active earthquakes induced by global warming. This seriously affects the safety of life and property of people in mountainous areas, and restricts the sustainable development of the economy and society in China's mountainous areas. The accurate prediction of the initiation volume of the debris flow slope source directly affects the accuracy of early warning and forecasting of the debris flow and the reliability of prevention and control engineering design. The difficulty lies in the real-time prediction of changes in the initiation volume of the debris flow slope source over time based on rainfall data and the physical and mechanical mechanisms of debris flow slope source initiation.

Under the action of rainfall, the initiation process of the debris flow slope source is usually affected by seepage, erosion or the combined effect of seepage and erosion. Due to the complex and diverse influencing factors, the debris flow has the characteristics of suddenness, randomness and unpredictability, making it hard to accurately predict the initiation volume of the debris flow slope source. At present, most of the calculation methods for the initiation volume of the debris flow slope source at home and abroad are limited to empirical models and based on a large number of simplified methods. They are quite different from the actual initiation volume and initiation process characteristics of the debris flow slope source, resulting in large errors in the prediction of the debris flow initiation volume.

The existing prediction methods of the initiation volume of the debris flow slope source are essentially based on four single models, which have the following problems:

1. The calculation based on the stochastic process model takes into account the random distribution of rainfall, runoff erosion, rainfall infiltration, gravity and soil parameters, but it is mainly based on statistical formulas, lacking physical meaning and certainty, and the calculation results fluctuate greatly.

2. The calculation based on the infinite slope model divides the slope into several segments, and calculates the sliding force and anti-sliding force of the segments according to the limit equilibrium. However, it believes that the debris flow slope source is initiated at one time, and the initiation depth is consistent with the source thickness, which is inconsistent with the actual gradual initiation process of the debris flow slope source, and it does not consider runoff erosion, random distribution of soil parameters and rainfall infiltration.

3. The calculation based on the slope erosion model essentially considers the erosion effect of the slope runoff caused by rainfall on the debris flow slope source, without considering the rainfall infiltration, the gravity and the random distribution of soil parameters.

4. The calculation based on the soil column model discretizes the slope into soil column elements, taking into account the gravity-induced interaction between the soil columns. However, it believes that the debris flow slope source represented by each soil column is initiated at one time and the slope initiation depth is consistent with the source thickness, without considering the gradual initiation process of the slope source caused by factors such as runoff erosion and random distribution of soil parameters.

In addition to these four models, there are some empirical formulas and simplified methods for predicting the initiation volume of the debris flow slope source. However, they are subject to various restrictions, resulting in a large difference between the predicted and real initiation volumes of the debris flow slope source, and making it hard to meet the requirements of debris flow warning and prevention for the calculation accuracy.

SUMMARY

The present disclosure aims to provide a dynamic prediction method and system for an initiation volume of a debris flow slope source. The present disclosure can accurately predict a debris flow initiation volume.

To achieve the above objective, the present disclosure provides a solution as follows:

A prediction method for an initiation volume of a debris flow slope source, where the prediction method includes:
  selecting a debris flow source slope to be predicted, and dividing the debris flow source slope to be predicted into regular hexagonal soil columns arranged in/rows and/columns;
  calculating a most unfavorable sliding surface of each soil column according to an upper bound theorem of a limit analysis, and calculating an unbalanced force on the most unfavorable sliding surface;
  determining whether each soil column is unstable according to the unbalanced force on the most unfavorable sliding surface; stopping the prediction of the soil column if a determination result indicates no, and if the determination result indicates yes, then
  acquiring centers of gravity and elevations of a central soil column and six adjacent soil columns around, determining an instability direction of the central soil column, and determining a force mode of the six surrounding adjacent soil columns on the central soil column;
  simulating the force mode of the six surrounding adjacent soil columns on the central soil column through a fiber bundle model, and determining a break status of connection bonds; stopping the prediction of the soil column if a determination result indicates that connection bonds of a lateral tensile stress are not all broken, and if the determination result indicates that the connection bonds of the lateral tensile stress are all broken, then
  determining whether the soil column is fluidized according to a fluidization criterion; stopping the prediction of the soil column if a determination result indicates no, and if the determination result indicates yes, predicting that the soil column is about to initiate a debris flow, and predicting an initiation volume of the debris flow slope source according to a fluidization status.

A prediction system for an initiation volume of a debris flow slope source, where the prediction system includes:
  a slope division module, for selecting a debris flow source slope to be predicted, and dividing the debris flow source slope to be predicted into regular hexagonal soil columns arranged in i rows and j columns;

a sliding surface and unbalanced force calculation module, for calculating a most unfavorable sliding surface of each soil column according to an upper bound theorem of a limit analysis, and calculating an unbalanced force on the most unfavorable sliding surface;

an instability determination module, for determining whether each soil column is unstable according to the unbalanced force on the most unfavorable sliding surface; stopping the prediction of the soil column if a determination result indicates no, and if the determination result indicates yes, connecting a force mode determination module;

the force mode determination module, for acquiring centers of gravity and elevations of a central soil column and six adjacent soil columns around, determining an instability direction of the central soil column, and determining a force mode of the six surrounding adjacent soil columns on the central soil column;

a connection bond break determination module, for simulating the force mode of the six surrounding adjacent soil columns on the central soil column through a fiber bundle model, and determining a break status of connection bonds; stopping the prediction of the soil column if a determination result indicates that connection bonds of a lateral tensile stress are not all broken, and if the determination result indicates that the connection bonds of the lateral tensile stress are all broken, connecting a fluidization determination module; and the fluidization determination module, for determining whether the soil column is fluidized according to a fluidization criterion; stopping the prediction of the soil column if a determination result indicates no, and if the determination result indicates yes, predicting that the soil column is about to initiate a debris flow, and predicting an initiation volume of the debris flow slope source according to a fluidization status.

Based on the specific embodiments provided by the present disclosure, the present disclosure has the following technical effects:

By digitizing a theoretical calculation model for the debris flow initiation volume, the present disclosure can accurately predict the initiation flow of a potential debris slope flow, and solve the long-standing problems of difficulty and low accuracy in calculating the debris flow initiation volume. By simulating a failure and interaction process between the soil columns through a fiber bundle model, the present disclosure can determine whether the soil column is about to fail according to a break status of the fiber bundle before a debris flow is initiated. In this way, the present disclosure can perform early prediction and analysis on the initiation of the debris slope flow, facilitating the planning of disaster prevention measures in advance.

DETAILED DESCRIPTION

The technical solutions of the embodiments of the present disclosure are clearly and completely described below with reference to the accompanying drawings. Apparently, the described embodiments are merely a part rather than all of the embodiments of the present disclosure. All other embodiments derived from the embodiments of the present disclosure by a person of ordinary skill in the art without creative efforts should fall within the protection scope of the present disclosure.

An objective of the present disclosure is to provide a prediction method and system for an initiation volume of a debris flow slope source. The present disclosure can accurately predict the initiation flow of a potential debris slope flow, and solve the long-standing problems of difficulty and low accuracy in calculating the debris slope flow initiation volume.

To make the above objectives, features and advantages of the present disclosure clearer and more comprehensible, the present disclosure is described in further detail below with reference to the accompanying drawings and specific implementations.

Figure 1:
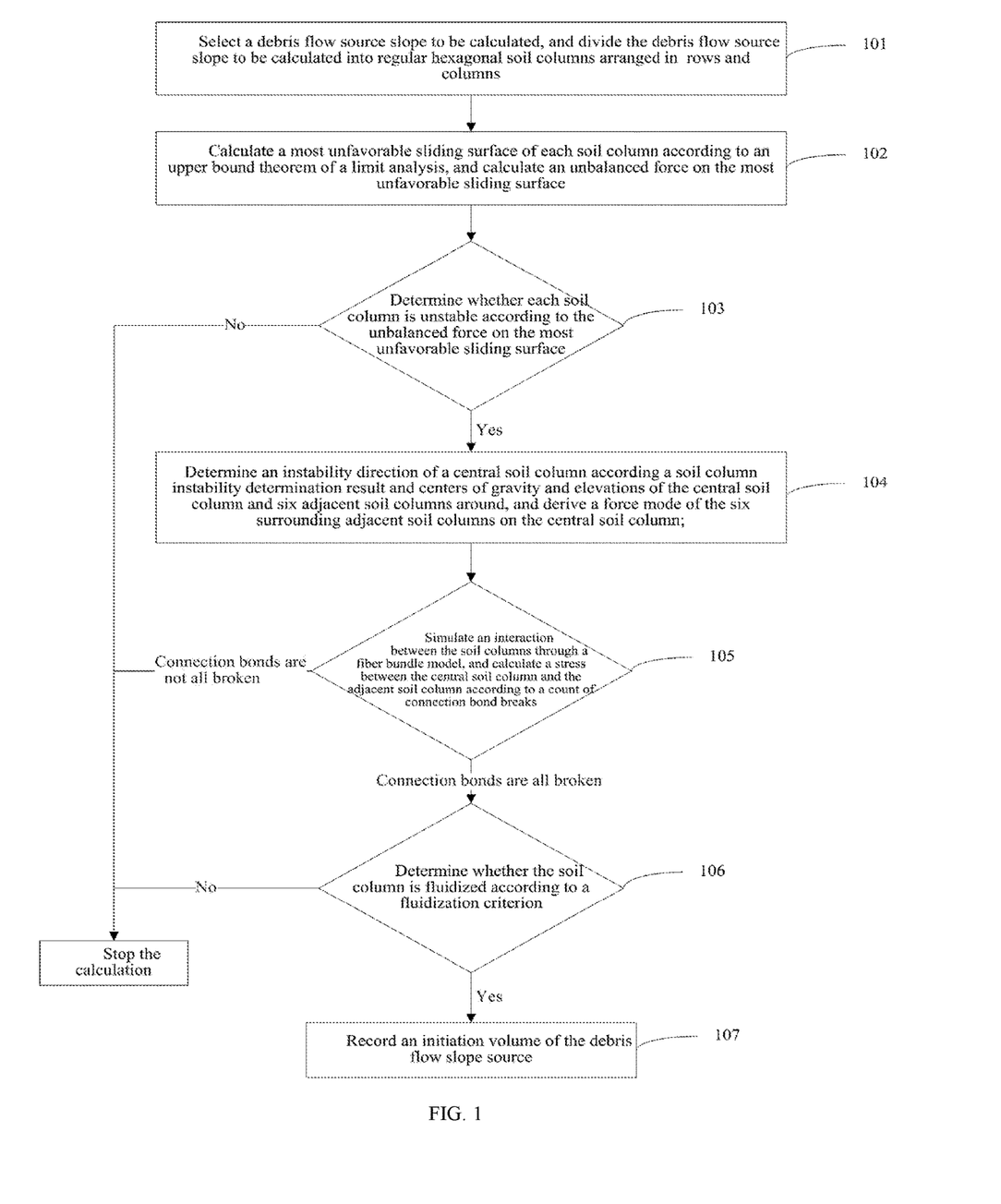
FIG. 1 is a flowchart of a prediction method for an initiation volume of a debris flow slope source according to the present disclosure.

FIG. 1 is a flowchart of the prediction method for an initiation volume of a debris flow slope source according to the present disclosure. The prediction method includes:

Step 101: Select a debris flow source slope to be predicted, and divide the debris flow source slope to be predicted into regular hexagonal soil columns arranged in/rows and/columns.

Step 102: Calculate a most unfavorable sliding surface of each soil column according to an upper bound theorem of a limit analysis, and calculate an unbalanced force on the most unfavorable sliding surface.

Step 103: Determine whether each soil column is unstable according to the unbalanced force on the most unfavorable sliding surface; stop the prediction of the soil column if a determination result indicates no, and if the determination result indicates yes, perform Step 104.

Step 104: Acquire centers of gravity and elevations of a central soil column and six adjacent soil columns around, determine an instability direction of the central soil column, and determine a force mode of the six surrounding adjacent soil columns on the central soil column.

Step 105: Simulate the force mode of the six surrounding adjacent soil columns on the central soil column through a fiber bundle model, and determine a break status of connection bonds; stop the prediction of the soil column if a determination result indicates that connection bonds of a lateral tensile stress are not all broken, and if the determination result indicates that the connection bonds of the lateral tensile stress are all broken, perform Step 106.

Step 106: Determine whether the soil column is fluidized according to a fluidization criterion; stop the prediction of the soil column if a determination result indicates no, and if the determination result indicates yes, predict that the soil column is about to initiate a debris flow, and predict an initiation volume of the debris flow slope source according to a fluidization status.

When the determination results in Steps 103, 105 and 106 indicate no, the initiation volume of the debris flow slope source may be recorded as zero.

Step 102 specifically includes:

Calculate a depth $H_{sd}$ and an angle $\alpha+\beta$ of the most unfavorable sliding surface according to the upper bound theorem of the limit analysis:

total external power:

$$\dot{W}_{ext} = \left(H_{sd} - \frac{1}{2}L_g\tan(\alpha+\beta)\right)L_g\rho_r g v \sin(\alpha+\beta) - \tau_T \frac{L_g}{\cos(\alpha+\beta)} v.$$

internal energy dissipation on the sliding surface:

$$\dot{D}_{int} = c \frac{L_g}{\cos(\alpha+\beta)} v \cos\varphi.$$

safety factor of the soil column K:

$$K = \frac{\dot{D}_{int}}{\dot{W}_{ext}} = \frac{c}{\left(H_{sd} - \frac{1}{2}L_g \tan(\alpha+\beta)\right)\rho_r g \sin(\alpha+\beta)\cos(\alpha+\beta) - \tau_T}.$$

corresponding minimum safety factor of the sliding surface:

$$\begin{cases} \frac{\partial K}{\partial \eta} = 0, \eta = \alpha + \beta \\ \frac{\partial K}{\partial H_{sd}} = 0 \end{cases}.$$

The calculating an unbalanced force on the most unfavorable sliding surface specifically includes:

Calculate a sliding force of the most unfavorable sliding surface according to $W_d = H_{sd}[\theta\rho_w + (1-\varphi)\rho_r]g \sin(\alpha+\beta)\cos(\alpha+\beta) - \tau_T + \tau_{rf} + \gamma_w h_s J$.

Calculate an anti-sliding force of the most unfavorable sliding surface according to $$\tau_s = \begin{cases} c + \{H_{sd}[\theta\rho_w + (1-\varphi)\rho_r]g\cos^2(\alpha+\beta) - \\ \chi h \rho_w g)\}\tan\gamma \end{cases}, H_1 - H_2 - H_{sd} > H_d \\ c + \{H_{sd}[\theta\rho_w + (1-\varphi)\rho_r]g\cos^2(\alpha+\beta) - \\ h_s \rho_w g \cos^2(\alpha+\beta)\}\tan\gamma \end{cases}, H_1 - H_2 - H_{sd} < H_d \end{cases}.$$

Calculate an unbalanced force on the most unfavorable sliding surface based on the sliding force and the anti-sliding force of the most unfavorable sliding surface.

$$\tau_T = \begin{cases} \sum_{n=0}^{n=5} \tau'_{Tn}, & t > 0 \\ 0, & t = 0 \end{cases},$$

where $\tau_T$ represents a total stress of the six surrounding adjacent soil columns to the central soil column, and $\tau'_{Tn}$ represents a stress of the surrounding adjacent soil column to the central soil column.

$L_g$ represents a spacing between the soil columns; C represents a cohesion of a root-soil complex of a debris flow source to be predicted; $H_{sd}$ represents a depth of the most unfavorable sliding surface; $\theta$ represents a soil moisture content of the debris flow source slope to be predicted; $\rho_w$ represents a density of water; $\varphi$ represents a porosity of the root-soil complex on the debris flow source slope to be predicted; $\rho_r$ represents a density of the root-soil complex on the debris flow source slope to be predicted; g represents an acceleration of gravity; $\alpha$ represents an angle of a bedrock; $\beta$ represents an angle between the most unfavorable sliding surface and the bedrock; $\chi$ represents a parameter related to a water-soil characteristic curve; h represents a capillary pressure head; $\gamma$ represents an internal friction angle of the root-soil complex on the debris flow source slope to be predicted; $\tau_{rf}$ represents a runoff erosivity of the debris flow source slope to be predicted; $\gamma_w$ represents a unit weight of the water; $h_s$ represents a phreatic level head in an area where the debris flow source slope to be predicted is located; J represents a phreatic level hydraulic gradient in the area where the debris flow source slope to be predicted is located; $H_1$ represents a slope elevation of the central soil column; $H_2$ represents a bedrock elevation of the central soil column; $H_d$ represents a groundwater level in the area where the debris flow source slope to be predicted is located.

Among the above parameters, the cohesion C of the root-soil complex of the debris flow source to be predicted and the internal friction angle $\gamma$ of the root-soil complex on the debris flow source slope to be predicted obey a Weibull distribution:

$$(c, \gamma) \sim f(x_{c,\gamma}; \lambda_{c,\gamma}; k_{c,\gamma}) = \begin{cases} \frac{k_{c,\gamma}}{\lambda_{c,\gamma}} \left(\frac{x_{c,\gamma}}{\lambda_{c,\gamma}}\right)^{k_{c,\gamma}-1} e^{-(x_{c,\gamma}/\lambda_{c,\gamma})^{k_{c,\gamma}}} & x_{c,\gamma} \geq 0 \\ 0 & x_{c,\gamma} < 0 \end{cases}.$$

The soil moisture content $\theta$ of the debris flow source slope to be predicted and the porosity $\varphi$ and density $\rho$ of the root-soil complex on the debris flow source slope to be predicted obey a normal distribution: $(\theta,\varphi,\rho) \sim N(\mu_\theta, \mu_\varphi, \mu_\rho; \sigma_\theta^2, \sigma_\varphi^2, \sigma_\rho^2)$.

$\mu_\theta$, $\mu_\varphi$, $\mu_\rho$ respectively represent an expectation of the normal distribution obeyed by the moisture content, the porosity and the density; $\sigma_\theta^2, \sigma_\varphi^2, \sigma_\rho^2$ respectively represent a variance of the normal distribution of the moisture content, the porosity and the density; the expectation and the variance are determined according to a measured value of the slope.

The parameters of the root-soil complex on the debris flow source slope to be predicted, such as density $\rho$, porosity $\varphi$, cohesion c and internal friction angle $\gamma$, are measured by conducting an indoor geotechnical test of the root-soil complex on the selected debris flow source slope to be predicted.

The soil moisture content $\theta$ of the debris flow source slope to be predicted, the parameter $\lambda$ related to a water-soil characteristic curve, the phreatic level head $h_s$ and phreatic level hydraulic gradient J in the area where the debris flow source slope to be predicted is located are calculated based on related theories or empirical equations such as Darcy's law and Richard equation.

Figure 2:
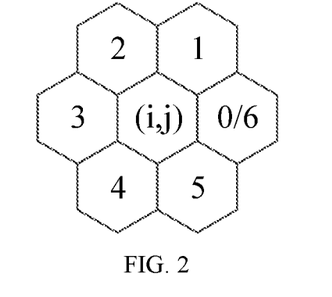
FIG. 2 shows numbering of soil columns.
Figure 3:
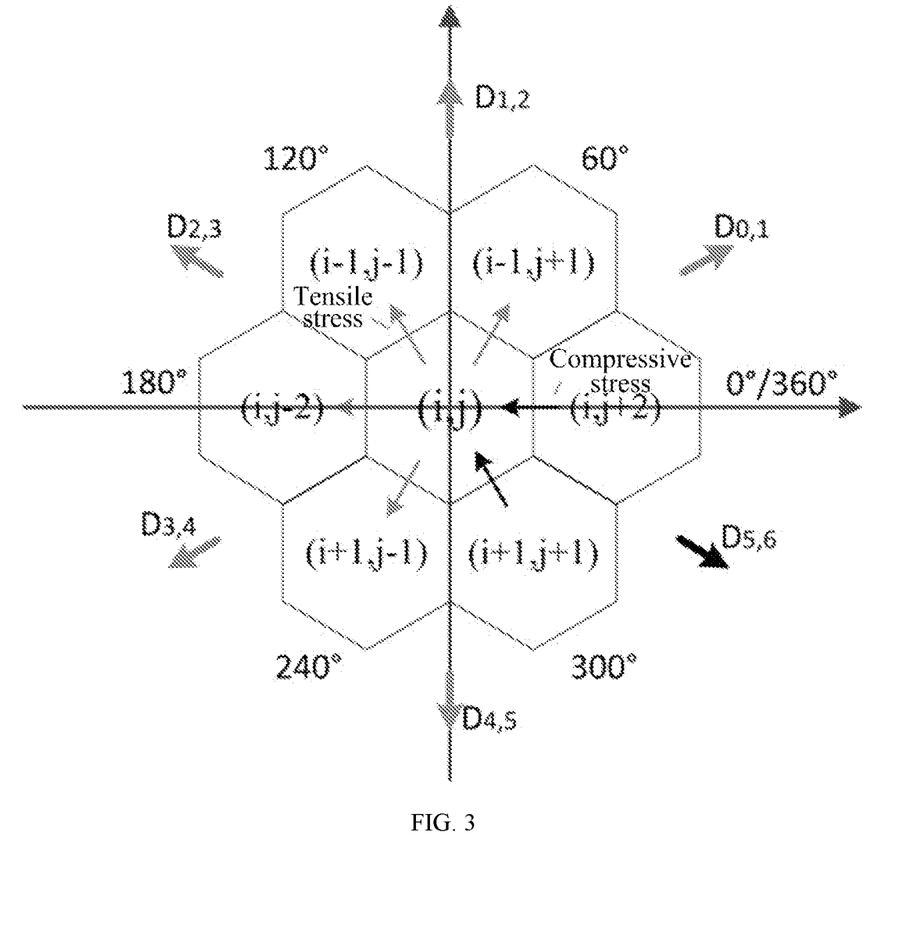
FIG. 3 shows a positional relationship between the soil columns.

Step 104 specifically includes:

The tendency of the instability and failure movement of the soil column determines the direction of force distribution between the soil columns. According to the principle of least action, the movement tendency of the soil column may be determined according to the center of gravity of a failure soil column. FIGS. 2 and 3 show numbering and positional relationship of the soil columns, where (i,j) indicate that the position of the soil column is in row i and column j.

As shown in FIG. 2, the surrounding soil columns are numbered. $D_{0,1}$, $D_{1,2}$, $D_{2,3}$, $D_{3,4}$, $D_{4,5}$ and $D_{5,6}$ represent six tendencies of instability and failure of the six soil columns. Taking $D_{5,6}$ as an example, if central soil column (i,j) is unstable along direction $D_{5,6}$, surrounding soil columns (i,j+2) and (i+1,j+1) in front of soil column (i,j) along direction $D_{5,6}$ are subjected to a compressive stress of soil column (i,j), and other soil columns are subjected to a tensile stress of soil column (i,j).

Step 104 specifically includes:

Acquire a position (i,j) of the central soil column, and determine the center of gravity of the central soil column as $(x_{i,j}, y_{i,j}, z_{i,j})$.

Determine, according to the position coordinates of the soil columns and a geometric principle, the center of gravity of the surrounding adjacent soil column as $(x_k, y_k, z_k)$ (k=0, 1,2,3,4,5,6):

$$\begin{cases} x_k = \frac{\sqrt{3}}{3} L_g \cos\left(\frac{k}{3}\pi\right) + x_{ij}, \\ y_k = \frac{\sqrt{3}}{3} L_g \cos\left(\frac{k}{3}\pi\right) + y_{ij}, \quad (k=0,1,2,3,4,5,6). \\ z_0 = z_6 = z_{i,j+1}, z_1 = z_{i-1,j}, z_2 = z_{i-1,j-1}, \\ z_3 = z_{i,j-1}, z_4 = z_{i+1,j-1}, z_5 = z_{i+1,j} \end{cases}$$

Acquire, according to the center-of-gravity coordinates of the central soil column and the surrounding adjacent soil column, a vector of the surrounding adjacent soil column relative to the central soil column, $(x'_k, y'_k, z'_k)$, $$\begin{cases} x'_k = \frac{\sqrt{3}}{3} L_g \cos\left(\frac{k}{3}\pi\right) \\ y'_k = \frac{\sqrt{3}}{3} L_g \cos\left(\frac{k}{3}\pi\right) \quad (k=0,1,2,3,4,5,6), \\ z'_k = z_k - z_{i,j} \end{cases}$$

where $L_g$ represents a spacing between adjacent soil columns.

Determine a sum vector of two adjacent soil columns among the surrounding soil columns as $(x'_{k,k+1}, y'_{k,k+1}, z'_{k,k+1})$:

$$\begin{cases} x'_{k,k+1} = \frac{\sqrt{3}}{3} L_g \cos\left(\frac{k}{3}\pi\right) + \frac{\sqrt{3}}{3} L_g \cos\left(\frac{k}{3}\pi\right), \\ y'_{k,k+1} = \frac{\sqrt{3}}{3} L_g \cos\left(\frac{k}{3}\pi\right) + \frac{\sqrt{3}}{3} L_g \cos\left(\frac{k}{3}\pi\right), \quad (k=0,1,2,3,4,5). \\ z'_{k,k+1} = z_k + z_{k+1}, \end{cases}$$

Determine a projected vector of the sum vector in a two-dimensional plane as $D_{k,k+1}$ (k=0,1,2,3,4,5).

Determine a sum vector with a lowest center of gravity $\min(z'_{k,k+1})$ (k=0,1,2,3,4,5) as a movement direction vector of the soil column according to a principle of least action.

Calculate, by taking a value of k in the case of $\min(z'_{k,k+1})$ (k=0,1,2,3,4,5), the projected vector of the movement direction of the central soil column in the two-dimensional plane as $(x''_{i,j}, y''_{i,j}): x''_{i,j} = x'_{k,k+1}, y''_{i,j} = y'_{k,k+1}$.

Determine a projected vector of a movement direction of the surrounding soil column in the two-dimensional plane as $(x''_k, y''_k)$.

Determine an angle $\theta_k$ between adjacent soil columns, $$\theta_k = \arccos \frac{x''_{i,j} * x''_k + y''_{i,j} * y''_k}{\sqrt{x''^2_{i,j} + y''^2_{i,j}} \sqrt{x''^2_k + y''^2_k}}.$$

Determine, when an angle between movement direction vectors of adjacent soil columns is an acute angle, that a force between the soil columns is a compressive stress; determine, when the angle between the movement direction vectors of the adjacent soil columns is an obtuse angle, that the force between the soil columns is a tensile stress.

If $$\theta_k < \frac{\pi}{2},$$

then $\tau'_{Tk} = -\tau_{Tk}$.

If $$\theta_k = \frac{\pi}{2},$$

then $\tau'_{Tk} = 0$.

If $$\theta_k > \frac{\pi}{2},$$

then $\tau'_{Tk} = \tau_{Tk}$.

$\tau_{Tk}$ represents a force exerted on the central soil column by a surrounding soil column that is unstable;

$\tau'_{Tk}$ represents a force exerted on the central soil column by the surrounding soil column, which is used to calculate the sliding force.

In the fiber bundle model, a load between the most unfavorable sliding surfaces or contact surfaces of the soil column is:

$$F = N_I \sigma_F + \frac{f_R N_F}{2} \frac{\sigma^2 F}{\sigma_{max}(\theta)};$$

a strength of the fiber bundle is:

$$\sigma_{max}(\theta) = \frac{2(2-f_R)}{N_F} A_c \tau_h(\theta);$$

a count of intact fiber bundles is:

$$N_I = \frac{(1-f_R)N_F \sigma_{max}(\theta) + \sqrt{N_F \sigma_{max}(\theta)[2Ff_R - 4F + N_F \sigma_{max}(\theta)]}}{(2-f_R)\sigma_{max}(\theta)}.$$

$N_I$ represents a count of intact fiber bundles; $N_F$ represents a total count of fiber bundles on the contact surface; $f_R$ represents a residual strength coefficient after the fiber bundle is broken ($f_R$=residual tensile strength after the fiber bundle is broken/tensile strength before the fiber bundle is broken); $\sigma_F$ represents a force exerted on each intact fiber bundle; $\sigma_{max}(\theta)$ represents a maximum tensile strength that a fiber bundle can withstand, which is related to the moisture content (measured by experiment); $A_c$ represents an area of the contact surface; $\tau_h(\theta)$ represents a tensile strength of the root-soil complex, which is related to the moisture content (measured by experiment).

$N_I$ represents a count of intact fiber bundles on the sliding surface or contact surface of the soil column; $N_F$ represents a total count of fiber bundles on the sliding surface or contact surface of the soil column. It can be found from the above equation that the size of $N_I$ is affected by a contact force, and the size of $N_I$ directly reflects the failure status of a foundation of the soil column. When $N_I=N_F$, it means that the fiber bundle on a failure surface of the soil column is not broken, that is, the soil column is intact without any damage. When $N_I<N_F$, it means that the soil column fails along the failure surface. When a ratio of $N_I$ to $N_F$ reaches a failure threshold (which is set according to a specific slope), it can be considered that the soil column fails, that is, the source will initiate. By recording the value of $N_I$, the failure level of the soil column can be predicted, that is, a potential failure-prone zone of the slope can be predicted. The purpose of disaster prevention and mitigation can be achieved by taking corresponding engineering measures before the slope fails.

The fiber bundle model is used to simulate the force mode of the six surrounding adjacent soil columns on the central soil column. According to the fiber bundle model, it is determined whether a ratio of the total count of fibers on the contact surface of adjacent soil columns to the count of intact fiber bundles is greater than the set threshold. If a determination result indicates no, it means that the connection bonds of a lateral tensile stress are not all broken. If the determination result indicates yes, it means that the connection bonds of the lateral tensile stress are all broken. The stress distribution of the soil column in a failure process is calculated according to a break status of the fiber bundle and the contact area between the soil columns.

When a soil column element of the slope is unstable along the most unfavorable sliding surface, under the action of root system, cementation, pore water, etc., the soil column distributes the compressive stress to the front soil column along the failure movement direction of the soil column through the connection bond, and distributes the tensile stress to the rear and side soil columns along the failure movement direction of the soil column.

Figure 4:
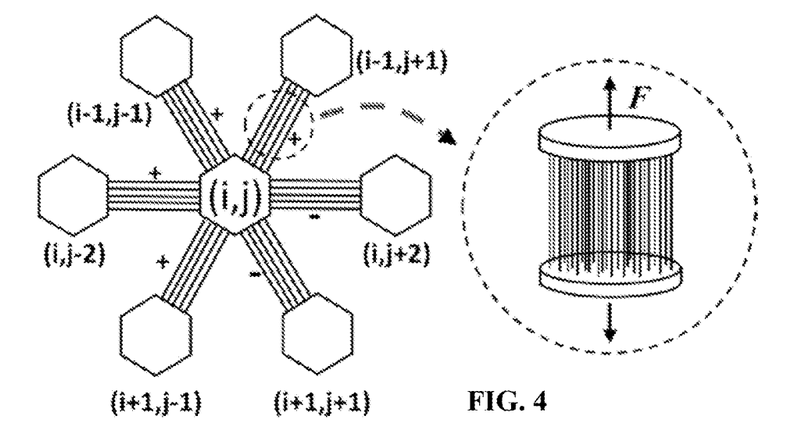
FIG. 4 shows stress transfer between the soil columns.

As shown in a stress transfer process in FIG. 4, the calculation is as follows:

$$A_{cn} = [\min(H_1 - h_{rf}, H_{1n} - h_{rfn}) - (H_1 - h_{rf} - H_{sd}))]L_g$$

$$\tau_{T0} = \frac{N_0}{(N_0 + N_1 + N_2 + N_3) + (N_4 + N_5)(K_2/K_1)} \frac{A_H(W_d - F_f - \tau_R)}{\cos(\alpha + \beta)A_{cn}}$$

$$\tau_{T4} = \frac{N_4(K_2/K_1)}{(N_0 + N_1 + N_2 + N_3) + (N_4 + N_5)(K_2/K_1)} \frac{A_H(W_d - F_f - \tau_R)}{\cos(\alpha + \beta)A_{cn}}$$

In the same way, calculation equations of $\tau_{T1}, \tau_{T2}, \tau_{T3}$ and $\tau_{T5}$ are derived, where n=0,1,2,3,4,5.

$A_{cn}$ represents a contact area between the central soil column and the six surrounding soil columns; $\tau_{T0}, \tau_{T1}, \tau_{T2}$ and $\tau_{T5}$ respectively represent a tensile stress of soil column (i,j) to surrounding soil columns; $\tau_{T4}$ and $\tau_{T5}$ respectively represent a compressive stress of soil column (i,j) to surrounding soil columns; $N_n$ represents a count of intact fibers between soil column (i,j) and a soil column numbered n; $K_2/K_1$ represents a distribution ratio between the compressive stress and the tensile stress; $h_{rf}$ represents an erosion depth of the central soil column (calculated based on an erosion model proposed by Iverson et al.); $h_{rfn}$ represents an erosion depth of the surrounding soil column numbered n; $H_1$ represents a slope elevation of the central soil column; $A_H$ represents a cross-sectional area of the soil column; $L_g$ represents a spacing between adjacent soil columns; $H_{1n}$ represents a slope elevation of the surrounding soil column numbered n; $\tau_R$ represents a residual strength of the soil column after a failure along the most unfavorable sliding surface.

A fluidization criterion of the soil column is:

$$\tau_c > \frac{2c\cos(\gamma)}{1-\sin(\gamma)} + \frac{2\sin(\gamma)}{1-\sin(\gamma)}\tau_h(\theta),$$

where $\tau_c$ represents a compressive strength of the central soil column; $\tau_h(\theta)$ represents a shear strength of the central soil column related to the moisture content; $\gamma$ represents an internal friction angle of the root-soil complex on the debris flow source to be predicted.

Figure 5:
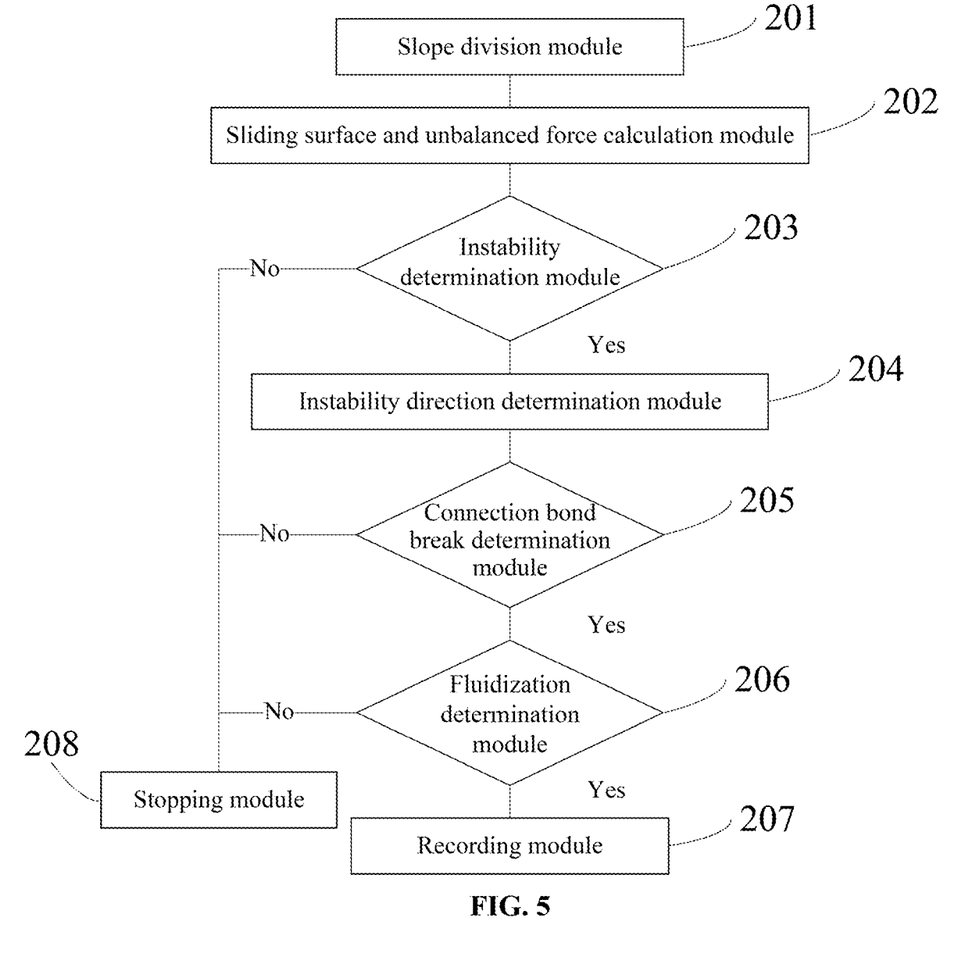
FIG. 5 shows a schematic diagram of a prediction system for an initiation volume of a debris flow slope source according to the present disclosure.

FIG. 5 shows a schematic diagram of the prediction system for an initiation volume of a debris flow slope source according to the present disclosure. The prediction system includes: a slope division module 201, a sliding surface and unbalanced force calculation module 202, an instability determination module 203, a force mode determination module 204, a connection bond break determination module 205, a fluidization determination module 206, a recording module 207 and a stopping module 208.

The slope division module 201 is used for selecting a debris flow source slope to be predicted, and dividing the debris flow source slope to be predicted into regular hexagonal soil columns arranged in i rows and j columns.

The sliding surface and unbalanced force calculation module 202 is used for calculating a most unfavorable sliding surface of each soil column according to an upper bound theorem of a limit analysis, and calculating an unbalanced force on the most unfavorable sliding surface.

The instability determination module 203 is used for determining whether each soil column is unstable according to the unbalanced force on the most unfavorable sliding surface; stopping the prediction of the soil column and connecting the stopping module 208 if a determination result indicates no, and if the determination result indicates yes, connecting the force mode determination module 204.

The force mode determination module 204 is used for acquiring centers of gravity and elevations of a central soil column and six adjacent soil columns around, determining an instability direction of the central soil column, and determining a force mode of the six surrounding adjacent soil columns on the central soil column.

The connection bond break determination module 205 is used for simulating the force mode of the six surrounding adjacent soil columns on the central soil column through a fiber bundle model, and determining a break status of connection bonds; stopping the prediction of the soil column and connecting the stopping module 208 if a determination result indicates that connection bonds of a lateral tensile stress are not all broken, and if the determination result indicates that the connection bonds of the lateral tensile stress are all broken, connecting the fluidization determination module 206.

The fluidization determination module 206 is used for determining whether the soil column is fluidized according to a fluidization criterion; stopping the prediction of the soil column and connecting the stopping module 208 if a determination result indicates no, and if the determination result indicates yes, predicting that the soil column is about to initiate a debris flow, and predicting an initiation volume of the debris flow slope source according to a fluidization status.

The prediction system of the present disclosure further includes a recording module 207, which is connected to the fluidization determination module 206, and is used to record an initiation position and a corresponding initiation volume of the debris flow, so as to facilitate subsequent reference and analysis. The recording module 207 may further record that the debris flow initiation volume of a non-fluidized soil column is zero. The instability determination module 203 and the connection bond break determination module 205 may further be connected to the recording module 207 to record that the debris flow initiation volume of a soil column whose prediction is stopped is zero.

In a specific implementation process, the prediction method and system provided by the present disclosure were used to simulate and invert the possibility and failure level of a debris flow in a valley in southwest China under the action of rainfall. In this example, the terrain parameters, hydrological parameters and soil parameters in the valley required for modelling were acquired through ArcGIS. The method and system were programmed by $C^{++}$ language to calculate the time-dependent initiation volume and cumulative total initiation volume of the debris flow in the valley, and the calculation results were imported into ArcGIS to simulate the gradual initiation process of the debris flow in the valley.

In the present disclosure, the most unfavorable sliding surface of the soil column is calculated by an upper bound theorem of a limit analysis. Compared with the landslide Hydro-mechanical Triggering (LHT) model assuming that the failure surface of the soil is on the bedrock surface, the calculation accuracy of the present disclosure is higher, and it is more in line with the actual initiation process of the debris flow on the slope. The inversion result of the present disclosure and the actual measured initiation volume of the debris flow have strong volatility, and have basically consistent peak values. The result of the total initiation volume of the debris flow derived by the simulation and inversion of the present disclosure is basically consistent with the actual observation value, and the error is small. This indicates that the prediction accuracy and precision of the present disclosure are higher.

Application effect 1: A valley where debris flows are not frequent but a large debris flow has occurred in history was selected, and the topographical parameters, soil parameters and historical hydrological parameters of the valley were acquired through on-site investigation, literature analysis and real-time monitoring. According to historical rainfall and hydrological data, the present disclosure predicted the initiation volume and source position of a debris flow that may be initiated in the valley under historical rainfall conditions. The peak initiation volume and total initiation volume of the debris flow can be used to determine the engineering prevention level, rationally design the size and quantity of the blocking dam, drainage channel and other projects, so as to reduce the waste of resources caused by unreasonable engineering design. The present disclosure can achieve the effect of preventing and controlling debris flows by minimizing the use of resources.

Application effect 2: According to the present disclosure, real-time monitoring is required for a valley with frequent debris flows. A debris flow early warning and forecasting platform can be established, which integrates functions such as real-time rainfall acquisition, initiation volume calculation and debris flow impact range division. According to the real-time acquisition of rainfall data, the present disclosure can be used to predict the initiation volume of the debris flow in real time, set a debris flow initiation volume-induced disaster threshold or level, realize the early warning and forecast of the debris flow before the initiation reaches the disaster threshold or level, and evacuate the affected people in time. The present disclosure can also quickly determine the location and scale of the debris flow after the debris flow occurs, which is helpful for planning rescue implementation plans and carrying out rescue and dredging operations in the disaster-affected area.

The present disclosure can meet the needs of various debris flow prevention and mitigation requirements, and is applied to different disaster prevention and mitigation scenarios.

For a system disclosed in the embodiments, since the system corresponds to the method disclosed in the embodiments, the description is simple, and reference may be made to the method description.

Several embodiments are used for illustration of the principles and implementations of the present disclosure. The description of the embodiments is used to help illustrate the method and its core principles of the present disclosure. In addition, those skilled in the art can make various modifications in terms of specific embodiments and scope of application in accordance with the teachings of the present disclosure. In conclusion, the content of the present specification should not be construed as a limitation to the present disclosure.

What is claimed is:

1. A prediction method for an initiation volume of a debris flow slope source, wherein the prediction method comprises:
    selecting a debris flow source slope to be predicted, and dividing the debris flow source slope to be predicted into regular hexagonal soil columns arranged in i rows and j columns;
    calculating a most unfavorable sliding surface of each soil column according to an upper bound theorem of a limit analysis, and calculating an unbalanced force on the most unfavorable sliding surface; wherein the most unfavorable sliding surface represents a sliding surface with a lowest stability coefficient along a depth of the soil column;
    determining whether each soil column is unstable according to the unbalanced force on the most unfavorable sliding surface; stopping the prediction of the soil column if a determination result indicates no, and if the determination result indicates yes, then
    acquiring centers of gravity and elevations of a central soil column and six adjacent soil columns around, determining an instability direction of the central soil column, and determining a force mode of the six surrounding adjacent soil columns on the central soil column;
    simulating the force mode of the six surrounding adjacent soil columns on the central soil column through a fiber bundle model, and determining a break status of connection bonds; stopping the prediction of the soil column if a determination result indicates that connection bonds of a lateral tensile stress are not all broken, and if the determination result indicates that the connection bonds of the lateral tensile stress are all broken, then
    determining whether the soil column is fluidized according to a fluidization criterion; stopping the prediction of the soil column if a determination result indicates no, and if the determination result indicates yes, predicting that the soil column is about to initiate a debris flow, and predicting an initiation volume of the debris flow slope source according to a fluidization status; and taking engineering measures to prevent and control disasters based on the predicted initiation volume, wherein the engineering measures comprise:
- determining an engineering prevention level, and rationally designing a size and quantity of a blocking dam and drainage channel so as to reduce the waste of resources caused by unreasonable engineering design;
- setting a debris flow initiation volume-induced disaster threshold or level, realizing an early warning and forecast of the debris flow before the initiation volume reaches the disaster threshold or level, and evacuating affected people in time; or
- determining the location and scale of the debris flow after the debris flow occurs, planning rescue implementation plans, and carrying out rescue and dredging operations;

wherein the acquiring centers of gravity and elevations of a central soil column and six adjacent soil columns around, determining an instability direction of the central soil column, and determining a force mode of the six surrounding adjacent soil columns on the central soil column specifically comprises:
- acquiring a position (i,j) of the central soil column, and determining the center of gravity of the central soil column as $(x_{i,j}, y_{i,j}, z_{i,j})$;
- determining, according to the position coordinates of the soil columns and a geometric principle, the center of gravity of the surrounding adjacent soil column as $(x_k, y_k, z_k)$ (k=0,1,2,3,4,5,6):

$$\begin{cases} x_k = \frac{\sqrt{3}}{3} L_g \cos\left(\frac{k}{3}\pi\right) + x_{i,j}, \\ y_k = \frac{\sqrt{3}}{3} L_g \cos\left(\frac{k}{3}\pi\right) + y_{i,j}, \quad (k = 0, 1, 2, 3, 4, 5, 6); \\ z_0 = z_6 = z_{i,j+1}, z_1 = z_{i-1,j}, z_2 = z_{i-1,j-1}, \\ z_3 = z_{i,j-1}, z_4 = z_{i+1,j-1}, z_5 = z_{i+1,j} \end{cases}$$

acquiring, according to the center-of-gravity coordinates of the central soil column and the surrounding adjacent soil column, a vector of the surrounding adjacent soil column relative to the central soil column, $(x'_k, y'_k, z'_k)$, $$\begin{cases} x'_k = \frac{\sqrt{3}}{3} L_g \cos\left(\frac{k}{3}\pi\right) \\ y'_k = \frac{\sqrt{3}}{3} L_g \cos\left(\frac{k}{3}\pi\right) \quad (k = 0, 1, 2, 3, 4, 5, 6); \\ z'_k = z_k - z_{i,j} \end{cases}$$

wherein $L_g$ represents a spacing between adjacent soil columns;

determining a sum vector of two adjacent soil columns among the surrounding soil columns as $(x'_{k,k+1}, y'_{k,k+1}, z_{k,k+1})$:

$$\begin{cases} x'_{k,k+1} = \frac{\sqrt{3}}{3} L_g \cos\left(\frac{k}{3}\pi\right) + \frac{\sqrt{3}}{3} L_g \cos\left(\frac{k}{3}\pi\right), \\ y'_{k,k+1} = \frac{\sqrt{3}}{3} L_g \cos\left(\frac{k}{3}\pi\right) + \frac{\sqrt{3}}{3} L_g \cos\left(\frac{k}{3}\pi\right), \quad (k = 0, 1, 2, 3, 4, 5) \\ z'_{k,k+1} = z_k - z_{k+1}, \end{cases}$$

determining a projected vector of the sum vector in a two-dimensional plane as $D_{k,k+1}$ (k=0,1,2,3,4,5);

determining a sum vector with a lowest center of gravity $\min(z'_{k,k+1})$ (k=0,1,2,3,4,5) as a movement direction vector of the soil column according to a principle of least action;

calculating, by taking a value of k in the case of $\min(z'_{k,k+1})$ (k=0,1,2,3,4,5), the projected vector of the movement direction of the central soil column in the two-dimensional plane as $(x''_{i,j}, y''_{i,j}): x''_{i,j} = x'_{k,k+1}, y''_{i,j} = y'_{k,k+1}$;

determining a projected vector of a movement direction of the surrounding soil column in the two-dimensional plane as $(x''_k, y''_k)$;

determining an angle $\theta_k$ between adjacent soil columns, $$\theta_k = \arccos \frac{x''_{i,j} * x''_k + y''_{i,j} * y''_k}{\sqrt{x''^2_{i,j} + y''^2_{i,j}} \sqrt{x''^2_k + y''^2_k}};$$

determining, when an angle between movement direction vectors of adjacent soil columns is an acute angle, that a force between the soil columns is a compressive stress; determining, when the angle between the movement direction vectors of the adjacent soil columns is an obtuse angle, that the force between the soil columns is a tensile stress;

wherein, if $$\theta_k < \frac{\pi}{2},$$

then $\tau'_{Tk} = -\tau_{Tk}$;
if $$\theta_k = \frac{\pi}{2},$$

then $\tau'_{Tk} = 0$;
if $$\theta_k > \frac{\pi}{2},$$

then $\tau'_{TK} = \tau_{Tk}$;

$\tau_{Tk}$ represents a force exerted on the central soil column by a surrounding soil column that is unstable;

$T'_{Tk}$ represents a force exerted on the central soil column by the surrounding soil column, which is used to calculate a sliding force.

2. The prediction method for an initiation volume of a debris flow slope source according to claim 1, wherein the calculating a most unfavorable sliding surface of each soil column according to an upper bound theorem of a limit analysis, and calculating an unbalanced force on the most unfavorable sliding surface specifically comprises:

calculating a depth $H_{sd}$ and an angle $\alpha+\beta$ of the most unfavorable sliding surface according to the upper bound theorem of the limit analysis:

$$\dot{W}_{ext} = \left(H_{sd} - \frac{1}{2}L_g\tan(\alpha+\beta)\right)L_g\rho_r g v\sin(\alpha+\beta) - \tau_T\frac{L_g}{\cos(\alpha+\beta)}v;$$

wherein, total external power:
internal energy dissipation on the sliding surface:

$$\dot{D}_{int} = c\frac{L_g}{\cos(\alpha+\beta)}v\cos\varphi;$$

safety factor of the soil column K:

$$K = \frac{\dot{D}_{int}}{\dot{W}_{ext}} = \frac{c}{\left(H_{sd} - \frac{1}{2}L_g\tan(\alpha+\beta)\right)\rho_r g\sin(\alpha+\beta)\cos(\alpha+\beta) - \tau_T};$$

corresponding minimum safety factor of the sliding surface:

$$\begin{cases} \frac{\partial K}{\partial \eta} = 0, \eta = \alpha+\beta \\ \frac{\partial K}{\partial H_{sd}} = 0 \end{cases};$$

the calculating an unbalanced force on the most unfavorable sliding surface specifically comprises:
calculating a sliding force of the most unfavorable sliding surface according to $W_d = H_{sd}[\theta\rho_w + (1-\varphi)\rho_r]g\sin(\alpha+\beta)\cos(\alpha+\beta) - \tau_T + \tau_{rf} + \gamma_w h_s J$;
calculating an anti-sliding force of the most unfavorable sliding surface according to $$\tau_s = \begin{cases} c + \{H_{sd}[\theta\rho_w + (1-\varphi)\rho_r]g\cos^2(\alpha+\beta) - \chi h\rho_w g\}\tan\gamma, & H_1 - H_2 - H_{sd} > H_d \\ c + \{H_{sd}[\theta\rho_w + (1-\varphi)\rho_r]g\cos^2(\alpha+\beta) - h_s\rho_w g\cos^2(\alpha+\beta)\}\tan\gamma, & H_1 - H_2 - H_{sd} < H_d \end{cases};$$

calculating an unbalanced force on the most unfavorable sliding surface based on the sliding force and the anti-sliding force of the most unfavorable sliding surface;
wherein, $$\tau_T = \begin{cases} \sum_{n=0}^{n=5} \tau'_{Tn}, & t > 0 \\ 0, & t = 0 \end{cases};$$

$\tau_T$ represents a total stress of the six surrounding adjacent soil columns to the central soil column, and $\tau'_{Tn}$ represents a stress of the surrounding adjacent soil column to the central soil column;
$L_g$ represents a spacing between the soil columns; C represents a cohesion of a root-soil complex of a debris flow source to be predicted; $H_{sd}$ represents a depth of the most unfavorable sliding surface; $\theta$ represents a soil moisture content of the debris flow source slope to be predicted; $\rho_w$ represents a density of water; $\varphi$ represents a porosity of the root-soil complex on the debris flow source slope to be predicted; $\rho_r$ represents a density of the root-soil complex on the debris flow source slope to be predicted; g represents an acceleration of gravity; $\alpha$ represents an angle of a bedrock; $\beta$ represents an angle between the most unfavorable sliding surface and the bedrock; $\chi$ represents a parameter related to a water-soil characteristic curve; h represents a capillary pressure head; $\gamma$ represents an internal friction angle of the root-soil complex on the debris flow source slope to be predicted; $\tau_{rf}$ represents a runoff erosivity of the debris flow source slope to be predicted; $\gamma_w$ represents a unit weight of the water; $h_s$ represents a phreatic level head in an area where the debris flow source slope to be predicted is located; J represents a phreatic level hydraulic gradient in the area where the debris flow source slope to be predicted is located; $H_1$ represents a slope elevation of the central soil column; $H_2$ represents a bedrock elevation of the central soil column; $H_d$ represents a groundwater level in the area where the debris flow source slope to be predicted is located; and v represents flow velocity.

3. The prediction method for an initiation volume of a debris flow slope source according to claim 2, wherein the cohesion C of the root-soil complex of the debris flow source to be predicted and the internal friction angle $\gamma$ of the root-soil complex on the debris flow source slope to be predicted obey a Weibull distribution:

$$(c, \gamma) \sim f(x_{c,\gamma}; \lambda_{c,\gamma}; k_{c,\gamma}) = \begin{cases} \frac{k_{c,\gamma}}{\gamma_{c,\gamma}}\left(\frac{x_{c,\gamma}}{\lambda_{c,\gamma}}\right)k_{c,\gamma}^{-1}e^{-(x_{c,\gamma}/\lambda_{c,\gamma})^{k_{c,\gamma}}} & x_{c,\gamma} \geq 0 \\ 0, & x_{c,\gamma} < 0 \end{cases};$$

the soil moisture content $\theta$ of the debris flow source slope to be predicted and the porosity $\varphi$ and density $\rho$ of the root-soil complex on the debris flow source slope to be predicted obey a normal distribution:

$$(\theta,\varphi,\rho) \sim N(\mu_\theta,\mu_\varphi,\mu_\rho;\sigma_\theta^2,\sigma_\varphi^2,\sigma_\rho^2);$$

wherein, $\mu_\theta,\mu_\varphi,\mu_\rho$ respectively represent an expectation of the normal distribution obeyed by the moisture content, the porosity and the density; $\sigma_\theta^2, \sigma_\varphi^2, \sigma_\rho^2$ respectively represent a variance of the normal distribution of the moisture content, the porosity and the density; the expectation and the variance are determined according to a measured value of the slope.

4. The prediction method for an initiation volume of a debris flow slope source according to claim 1, wherein the simulating the force mode of the six surrounding adjacent soil columns on the central soil column through a fiber bundle model, and determining a break status of connection bonds specifically comprises:
simulating an interaction between the soil columns through a fiber bundle model, and calculating a stress distribution of the soil column in a failure process according to a break status of a fiber bundle and a contact area between the soil columns;
wherein, the calculation is as follows:

$$A_{cn} = [\min(H_1 - h_{rf}, H_{1n} - h_{rfn}) - (H_1 - h_{rf}H_{sd})]L_g$$

$$\tau_{T0} = \frac{N_0}{(N_0 + N_1 + N_2 + N_3) + (N_4 + N_5)(K_2/K_1)}\frac{A_H(W_d - F_f - \tau_R)}{\cos(\alpha+\beta)A_{cn}}$$

-continued $$\tau_{T4} = \frac{N_4(K_2/K_1)}{(N_0+N_1+N_2+N_3)+(N_4+N_5)(K_2/K_1)} \frac{A_H(W_d-F_f\tau_R)}{\cos(\alpha+\beta)A_{cn}}$$

in the same way, calculation equations of $\tau_{T1}$, $\tau_{T2}$, $\tau_{T3}$ and $\tau_{T5}$ are derived, wherein n=0,1,2,3,4,5;

$A_{cn}$ represents a contact area between the central soil column and the six surrounding soil columns; $\tau T_0$, $\tau_{T1}$, $\tau_{T2}$ and $\tau_{T3}$ respectively represent a tensile stress of soil column (i,j) to surrounding soil columns; $\tau_{T4}$ and $\tau_{T5}$ respectively represent a compressive stress of soil column (i,j) to surrounding soil columns; $N_n$ represents a count of intact fibers between soil column (i,j) and a soil column numbered n; $K_2/K_1$ represents a distribution ratio between the compressive stress and the tensile stress; $h_{rf}$ represents an erosion depth of the central soil column; $h_{rfn}$ represents an erosion depth of the surrounding soil column numbered n; $H_1$ represents a slope elevation of the central soil column; $A_H$ represents a cross-sectional area of the soil column; $L_g$ represents a spacing between adjacent soil columns; $H_{1n}$ represents a slope elevation of the surrounding soil column numbered n; $\tau_R$ represents a residual strength of the soil column after a failure along the most unfavorable sliding surface; $H_{sd}$ represents a depth of the most unfavorable sliding surface; $W_d$ represents a sliding force of the soil column; $F_f$ represents a frictional force on the sliding surface; $\alpha$ represents an angle of a bedrock; and $\beta$ represents an angle between the most unfavorable sliding surface and the bedrock.

5. A prediction system for an initiation volume of a debris flow slope source, wherein the prediction system comprises a processor; the processor is configured to:
   select a debris flow source slope to be predicted, and dividing the debris flow source slope to be predicted into regular hexagonal soil columns arranged in i rows and j columns;
   calculate a most unfavorable sliding surface of each soil column according to an upper bound theorem of a limit analysis, and calculate an unbalanced force on the most unfavorable sliding surface; wherein the most unfavorable sliding surface represents a sliding surface with a lowest stability coefficient along a depth of the soil column;
   determine whether each soil column is unstable according to the unbalanced force on the most unfavorable sliding surface; stop the prediction of the soil column if a determination result indicates no, and if the determination result indicates yes;
   acquire centers of gravity and elevations of a central soil column and six adjacent soil columns around, determine an instability direction of the central soil column, and determine a force mode of the six surrounding adjacent soil columns on the central soil column;
   simulate the force mode of the six surrounding adjacent soil columns on the central soil column through a fiber bundle model, and determine a break status of connection bonds; stop the prediction of the soil column if a determination result indicates that connection bonds of a lateral tensile stress are not all broken, and if the determination result indicates that the connection bonds of the lateral tensile stress are all broken;
   determine whether the soil column is fluidized according to a fluidization criterion; stop the prediction of the soil column if a determination result indicates no, and if the determination result indicates yes, predict that the soil column is about to initiate a debris flow, and predict an initiation volume of the debris flow slope source according to a fluidization status; and
   take engineering measures to prevent and control disasters based on the predicted initiation volume, wherein the engineering measures comprise:
      determining an engineering prevention level, and rationally designing a size and quantity of a blocking dam and drainage channel so as to reduce the waste of resources caused by unreasonable engineering design;
      setting a debris flow initiation volume-induced disaster threshold or level, realizing an early warning and forecast of the debris flow before the initiation volume reaches the disaster threshold or level, and evacuating affected people in time; or
   determining the location and scale of the debris flow after the debris flow occurs, planning rescue implementation plans, and carrying out rescue and dredging operations;
wherein the processor is further configured to:
acquire a position (i,j) of the central soil column, and determine the center of gravity of the central soil column as $(x_{i,j}, y_{i,j}, z_{i,j})$;
determine, according to the position coordinates of the soil columns and a geometric principle, the center of gravity of the surrounding adjacent soil column as $(x_k,y_k,z_k)$ (k=0,1,2,3,4,5,6):

$$\begin{cases} x_k = \frac{\sqrt{3}}{3}L_g\cos\left(\frac{k}{3}\pi\right) + x_{i,j}, \\ y_k = \frac{\sqrt{3}}{3}L_g\cos\left(\frac{k}{3}\pi\right) + y_{i,j}, \quad (k=0,1,2,3,4,5,6); \\ z_0 = z_6 = z_{i,j+1}, z_1 = z_{i-1,j}, z_2 = z_{i-1,j-1}, \\ z_3 = z_{i,j-1}, z_4 = z_{i+1,j-1}, z_5 = z_{i+1,j} \end{cases}$$

acquire, according to the center-of-gravity coordinates of the central soil column and the surrounding adjacent soil column, a vector of the surrounding adjacent soil column relative to the central soil column, $(x'_k,y'_k,z'_k)$, $$\begin{cases} x'_k = \frac{\sqrt{3}}{3}L_g\cos\left(\frac{k}{3}\pi\right) \\ y'_k = \frac{\sqrt{3}}{3}L_g\cos\left(\frac{k}{3}\pi\right) \quad (k=0,1,2,3,4,5,6), \\ z'_k = z_k - z_{i,j} \end{cases}$$

wherein $L_g$ represents a spacing between adjacent soil columns;
determine a sum vector of two adjacent soil columns among the surrounding soil columns as $(x'_{k,k+1}, y'_{k,k+1}, z'_{k,k+1})$:

$$\begin{cases} x'_{k,k+1} = \frac{\sqrt{3}}{3}L_g\cos\left(\frac{k}{3}\pi\right) + \frac{\sqrt{3}}{3}L_g\cos\left(\frac{k}{3}\pi\right), \\ y'_{k,k+1} = \frac{\sqrt{3}}{3}L_g\cos\left(\frac{k}{3}\pi\right) + \frac{\sqrt{3}}{3}L_g\cos\left(\frac{k}{3}\pi\right), \quad (k=0,1,2,3,4,5) \\ z'_{k,k+1} = z_k + z_{k+1}, \end{cases}$$

determine a projected vector of the sum vector in a two-dimensional plane as $D_{k,k+1}$ (k=0,1,2,3,4,5);
determine a sum vector with a lowest center of gravity $\min(z'_{k,k+1})$ (k=0,1,2,3,4,5) as a movement direction vector of the soil column according to a principle of least action;

calculate, by taking a value of k in the case of min($z'_{k,k+1}$) (k=0,1,2,3,4,5), the projected vector of the movement direction of the central soil column in the two-dimensional plane as ($x''_{i,j}, y''_{i,j}$): $x''_{i,j} = x'_{k,k+1}$, $y''_{i,j} = y'_{k,k+1}$;

determine a projected vector of a movement direction of the surrounding soil column in the two-dimensional plane as ($x''_k, y''_k$);

determine an angle $\theta_k$ between adjacent soil columns, $$\theta_k = \arccos \frac{x''_{i,j} * x''_k + y''_{i,j} * y''_k}{\sqrt{x''^2_{i,j} + y''^2_{i,j}} \sqrt{x''^2_k + y''^2_k}};$$

determine, when an angle between movement direction vectors of adjacent soil columns is an acute angle, that a force between the soil columns is a compressive stress;

determine, when the angle between the movement direction vectors of the adjacent soil columns is an obtuse angle, that the force between the soil columns is a tensile stress;

wherein, if $$\theta_k < \frac{\pi}{2},$$

then $\tau'_{Tk} = -\tau_{Tk}$;
if $$\theta_k = \frac{\pi}{2},$$

then $\tau'_{Tk} = 0$;
if $$\theta_k > \frac{\pi}{2},$$

then $\tau'_{TK} = \tau_{Tk}$;

$\tau_{Tk}$ represents a force exerted on the central soil column by a surrounding soil column that is unstable;

$T'_{Tk}$ represents a force exerted on the central soil column by the surrounding soil column, which is used to calculate a sliding force.

6. The prediction system for an initiation volume of a debris flow slope source according to claim 5, wherein the processor is further configured to:

calculate a depth $H_{sd}$ and an angle $\alpha+\beta$ of the most unfavorable sliding surface according to the upper bound theorem of the limit analysis:

wherein, total external power:

$$\dot{W}_{ext} = \left(H_{sd} - \frac{1}{2}L_g \tan(\alpha+\beta)\right) L_g \rho_r g v \sin(\alpha+\beta) - \tau_T \frac{L_g}{\cos(\alpha+\beta)} v;$$

internal energy dissipation on the sliding surface:

$$\dot{D}_{int} = c \frac{L_g}{\cos(\alpha+\beta)} v \cos\varphi;$$

safety factor of the soil column K:

$$K = \frac{\dot{D}_{int}}{\dot{W}_{ext}} = \frac{c}{\left(H_{sd} \frac{1}{2} L_g \tan(\alpha+\beta)\right)\rho_r g \sin(\alpha+\beta)\cos(\alpha+\beta) - \tau_T};$$

corresponding minimum safety factor of the sliding surface:

$$\begin{cases} \frac{\partial K}{\partial \eta} = 0, \eta = \alpha+\beta \\ \frac{\partial K}{\partial H_{sd}} = 0 \end{cases};$$

calculate an unbalanced force on the most unfavorable sliding surface, specifically comprising:

calculating a sliding force of the most unfavorable sliding surface according to $W_d = H_{sd}[\theta\rho_w + (1-\varphi)\rho_r]g \sin(\alpha+\beta)\cos(\alpha+\beta) - \tau_T + \tau_{rf} + \gamma_w h_s J$;

calculating an anti-sliding force of the most unfavorable sliding surface according to $$\tau_s = \begin{cases} c + \{H_{sd}[\theta\rho_w + (1-\varphi)\rho_r]g\cos^2(\alpha+\beta) - \chi h \rho_w g\} \tan\gamma, & H_1 - H_2 - H_{sd} > H_d \\ c + \{H_{sd}[\theta\rho_w + (1-\varphi)\rho_r]g\cos^2(\alpha+\beta) - h_s \rho_w g \cos^2(\alpha+\beta)\} \tan\gamma, & H_1 - H_2 - H_{sd} < H_d \end{cases};$$

calculating an unbalanced force on the most unfavorable sliding surface based on the sliding force and the anti-sliding force of the most unfavorable sliding surface;

wherein, $$\tau_T = \begin{cases} \sum_{n=0}^{n=5} t'_{Tn}, & t > 0 \\ 0 & t = 0 \end{cases};$$

$\tau_T$ represents a total stress of the six surrounding adjacent soil columns to the central soil column, and $t'_{Tn}$ represents a stress of the surrounding adjacent soil column to the central soil column;

$L_g$ represents a spacing between the soil columns; C represents a cohesion of a root-soil complex of a debris flow source to be predicted; $H_{sd}$ represents a depth of the most unfavorable sliding surface; $\theta$ represents a soil moisture content of the debris flow source slope to be predicted; $\rho_w$ represents a density of water; $\varphi$ represents a porosity of the root-soil complex on the debris flow source slope to be predicted; $\rho_r$ represents a density of the root-soil complex on the debris flow source slope to be predicted; g represents an acceleration of gravity; $\alpha$ represents an angle of a bedrock; $\beta$ represents an angle between the most unfavorable sliding surface and the bedrock; $\chi$ represents a parameter related to a water-soil characteristic curve; h represents a capillary pressure head; $\gamma$ represents an internal friction angle of the root-soil complex on the debris flow source slope to be predicted; $\tau_{rf}$ represents a runoff erosivity of the debris flow source slope to be predicted; $\gamma_w$ represents a unit weight of the water; $h_s$ represents a phreatic level head in an area where the debris flow source slope to be predicted is located; J represents a phreatic level hydraulic gradient in the area where the debris flow source slope to be predicted is located; $H_1$ represents a slope elevation of the central soil column; $H_2$ represents a bedrock elevation of the central soil column; $H_d$ represents a groundwater level in the area where the debris flow source slope to be predicted is located; and v represents flow velocity.

7. The prediction method for an initiation volume of a debris flow slope source according to claim 6, wherein the cohesion C of the root-soil complex of the debris flow source to be predicted and the internal friction angle $\gamma$ of the root-soil complex on the debris flow source slope to be predicted obey a Weibull distribution:

$$(c,\gamma) \sim f(x_{c,\gamma}; \lambda_{c,\gamma}; k_{c,\gamma}) = \begin{cases} \frac{k_{c,\gamma}}{\lambda_{c,\gamma}}\left(\frac{x_{c,\gamma}}{\lambda_{c,\gamma}}\right)^{k_{c,\gamma}-1} e^{-(x_{c,\gamma}/\lambda_{c,\gamma})^{k_{c,\gamma}}}, & x_{c,\gamma} \geq 0 \\ 0, & x_{c,\gamma} < 0 \end{cases};$$

the soil moisture content $\theta$ of the debris flow source slope to be predicted and the porosity $\varphi$ and density $\rho$ of the root-soil complex on the debris flow source slope to be predicted obey a normal distribution:

$(\theta,\varphi,\rho) \sim N(\mu_\theta, \mu_\varphi, \mu_\rho; \sigma_\theta^2, \sigma_\varphi^2, \sigma_\rho^2);$ wherein, $\mu_\theta, \mu_\varphi, \mu_\rho$ respectively represent an expectation of the normal distribution obeyed by the moisture content, the porosity and the density; $\sigma_\theta^2, \sigma_\varphi^2, \sigma_\rho^2$ respectively represent a variance of the normal distribution of the moisture content, the porosity and the density; the expectation and the variance are determined according to a measured value of the slope.

8. The prediction system for an initiation volume of a debris flow slope source according to claim 5, wherein
an interaction between the soil columns is simulated through a fiber bundle model, and a stress distribution of the soil column in a failure process is calculated according to a break status of a fiber bundle and a contact area between the soil columns;
the calculation is as follows:

$$A_{cn} = [\min(H_1 - h_{rf}, H_{1n} - h_{rfn}) - (H_1 - h_{rf}H_{sd}))]L_g$$

$$\tau_{T0} = \frac{N_0}{(N_0 + N_1 + N_2 + N_3) + (N_4 + N_5)(K_2/K_1)} \frac{A_H(W_d - F_f - \tau_R)}{\cos(\alpha + \beta)A_{cn}}$$

$$\tau_{T4} = \frac{N_4(K_2/K_1)}{(N_0 + N_1 + N_2 + N_3) + (N_4 + N_5)(K_2/K_1)} \frac{A_H(W_d - F_f\tau_R)}{\cos(\alpha + \beta)A_{cn}}$$

in the same way, calculation equations of $\tau_{T1}$, $\tau_{T2}$, $\tau_{T3}$ and $\tau_{T5}$ are derived, wherein n=0,1,2,3,4,5;

$A_{cn}$ represents a contact area between the central soil column and the six surrounding soil columns; $\tau_{T0}$, $\tau_{T1}$, $T_{\tau 2}$ and $\tau_{T3}$ respectively represent a tensile stress of soil column (i,j) to surrounding soil columns; $\tau_{T4}$ and $\tau_{T5}$ respectively represent a compressive stress of soil column (i,j) to surrounding soil columns; $N_n$ represents a count of intact fibers between soil column (i,j) and a soil column numbered n; $K_2/K_1$ represents a distribution ratio between the compressive stress and the tensile stress; $h_{rf}$ represents an erosion depth of the central soil column; $h_{rfn}$ represents an erosion depth of the surrounding soil column numbered n; $H_1$ represents a slope elevation of the central soil column; $A_H$ represents a cross-sectional area of the soil column; $L_g$ represents a spacing between adjacent soil columns; $H_{1n}$ represents a slope elevation of the surrounding soil column numbered n; $\tau_R$ represents a residual strength of the soil column after a failure along the most unfavorable sliding surface; $H_{sd}$ represents a depth of the most unfavorable sliding surface; $W_d$ represents a sliding force of the soil column; $F_f$ represents a frictional force on the sliding surface; $\alpha$ represents an angle of a bedrock; and $\beta$ represents an angle between the most unfavorable sliding surface and the bedrock.

* * * * *